United States Patent [19]

Stoub et al.

[11] 4,298,944
[45] Nov. 3, 1981

[54] DISTORTION CORRECTION METHOD AND APPARATUS FOR SCINTILLATION CAMERAS

[75] Inventors: Everett W. Stoub, Villa Park; James G. Colsher, Schaumburg, both of Ill.; Gerd Muehllehner, Wayne, Pa.

[73] Assignee: Siemens Gammasonics, Inc., Des Plaines, Ill.

[21] Appl. No.: 51,176

[22] Filed: Jun. 22, 1979

[51] Int. Cl.³ .............................................. G01T 1/20
[52] U.S. Cl. .............................. 364/515; 250/363 S; 315/370; 364/571
[58] Field of Search ............. 364/515, 571, 518, 579, 364/580, 525; 250/363 R, 363 S, 369; 315/320; 340/728

[56] References Cited

U.S. PATENT DOCUMENTS

| | | | |
|---|---|---|---|
| 3,745,345 | 7/1973 | Muehllehner | 250/363 R |
| 3,851,177 | 11/1974 | Van Dijk et al. | 250/363 S |
| 4,058,728 | 11/1977 | Nickles | 250/363 S |
| 4,060,730 | 11/1977 | Zioni et al. | 364/525 |
| 4,115,694 | 9/1978 | Lange et al. | 250/363 S |
| 4,151,416 | 4/1979 | Richey et al. | 250/363 S |
| 4,179,607 | 12/1979 | Lange et al. | 250/363 S |
| 4,223,221 | 9/1980 | Gambini et al. | 250/363 S |

OTHER PUBLICATIONS

Knoll et al.; "Real Time Correction of Radio-Isotope Camera Signals for Non-Uniformity and Nonlinearity"; *Jnl. of Nuclear Medicine*, 19:746; 1978.
Lapidus; "A New Method of Correcting for Detector Non-Uniformity in Gamma Cameras"; *Raytheon Medical Electronics*, St-3405, Nov. 1977.
Varoutas et al.; *Digital Image Processing Applied to Scintillation Images from Biomedical Engineering;* vol. BME-24, No. 4, Jul. 1977.
Spector et al.; "Analysis and Correction of Spatial Distortions Produced by the Gamma Camera"; *Jnl. of Nuclear Medicine*, 13: pp. 307-312, 1972.
Padikal et al.; "Field Flood Uniformity Correction: Benefits or Pitfalls"; *Jnl of Nuclear Medicine*, pp. 653-656, 1976.
Hannan et al.; "Pitfalls in Gamma Field Uniformity Correction"; *British Jnl. of Radiology* 47: pp. 820-821, 1974.
Jansson et al.; "Pitfalls in Gamma Camera Field Uniformity Correction", *British Jnl. of Radiology*, 48: pp. 408-409, 1975.
Gray et al.; "Maximum a Posteriori Estimation of Position in Scintillation Cameras", IEEE vol. NS-23, No. 1, Feb. 1976.
Todd-Pokropek et al.; "The Non-Uniformity of Imaging Devices and its Impact in Quantitative Studies"; *Medical Radionuclide Imaging;* vol. 1, pp. 67-84 Vienna, IAEA, 1977.
Hasman et al.; "Gamma-Camera Uniformity as a Function of Energy and Count Rate", *British Jnl. of Radiology*, 49, pp. 718-722, 1976.
Tuinen et al.; "Scintillation Camera Nonuniformity: Effects on Cold Lesion Detectability"; *Int'l Jnl. of Nucl. Med. and Biology;* vol. 5, pp. 140-144, 1978.

*Primary Examiner*—Errol A. Krass
*Attorney, Agent, or Firm*—Spellman, Joel & Pelton

[57] ABSTRACT

A method and apparatus for correcting for the spatial distortions of scintillation cameras or similar image forming apparatus. The spatial distortion correction method accurately and precisely determines distortion correction factors in an off-line test measurement and analysis phase prior to actual on-line diagnostic use. The distortion correction factors are initially determined from image event data that is obtained during the test measurement phase by orthogonal line pattern images. Data from a uniform field flood image is also utilized during the test measurement phase to refine and modify the distortion correction factors utilizing the gradient of a function of the field flood image data. Scintillation camera image repositioning apparatus is provided and includes a memory having the correction factors stored therein in a predetermined array. During the on-line use of the scintillation camera and associated image display system, the image repositioning apparatus transforms the data from the scintillation camera in accordance with the stored distortion correction factors. In a preferred arrangement, the image event data is repositioned or corrected event by event.

11 Claims, 13 Drawing Figures

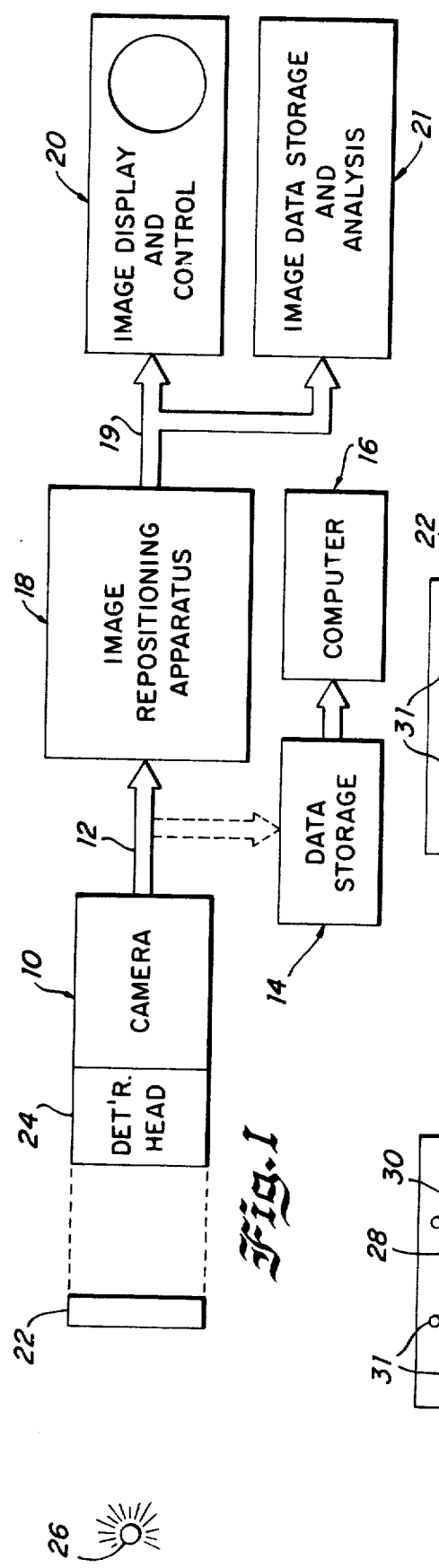
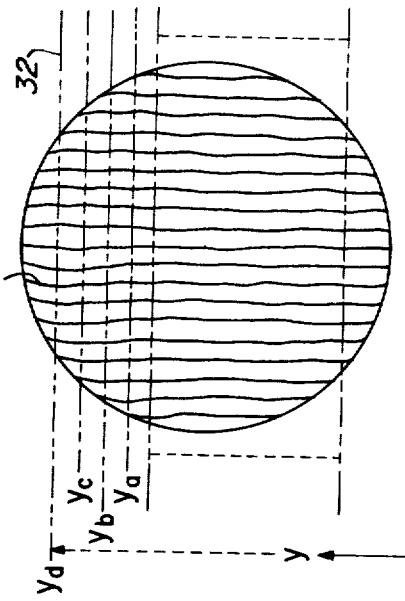
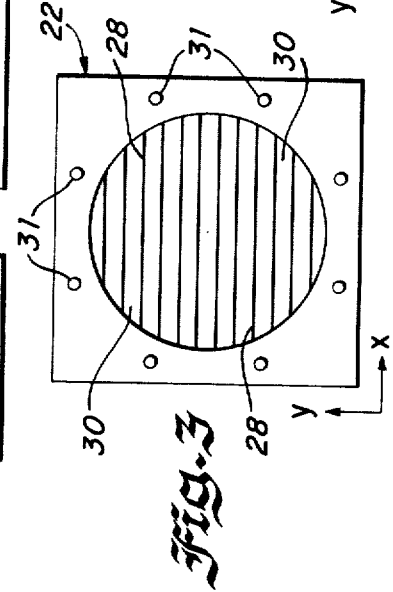
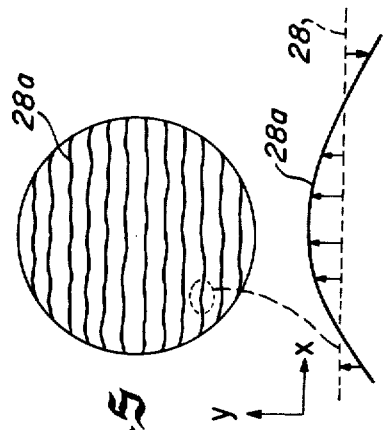
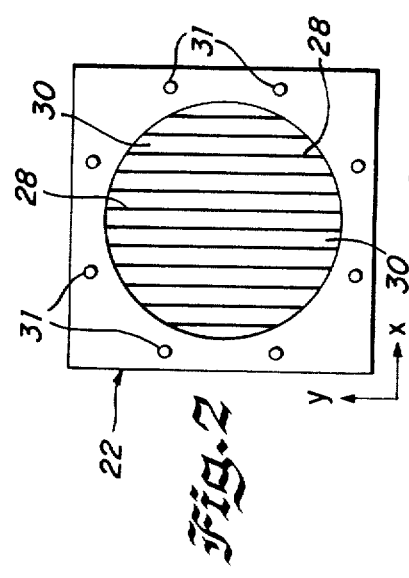
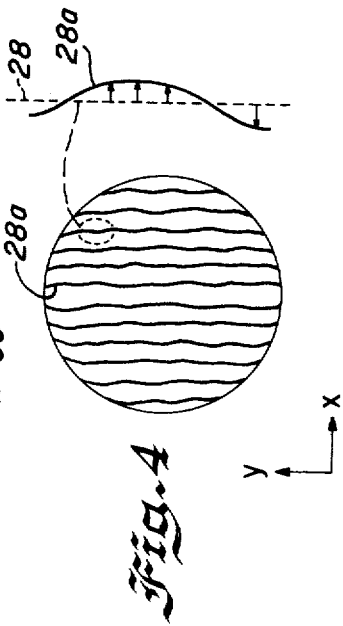

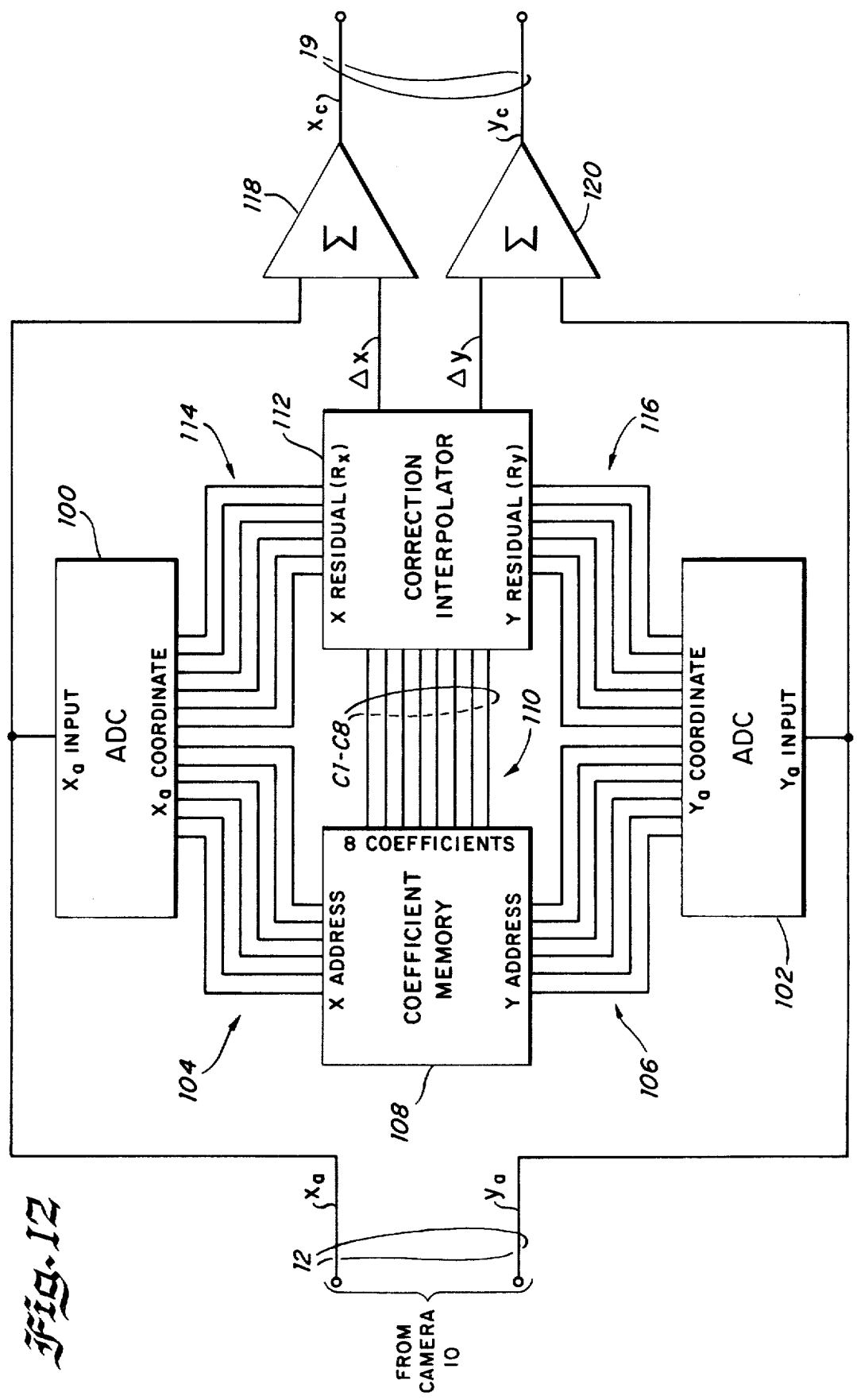

DISTORTION CORRECTION METHOD AND APPARATUS FOR SCINTILLATION CAMERAS

BACKGROUND OF THE INVENTION

1. Field of the Invention

The present invention relates generally to the field of scintillation camera and image display forming apparatus and more particularly to a method and apparatus for correcting for the spatial distortion of scintillation cameras.

2. Description of the Prior Art

Distortion in the image or image data obtained from scintillation cameras and associated image display apparatus is primarily due to variations in point source sensitivity and spatial distortion. In presently available scintillation cameras known as the "Anger-type", variations in point source sensitivity are maintainable in well designed camera systems with proper tuning and adjustment to within 1-2%. Spatial distortions are the result of systematic errors in the positioning of scintillation events largely due to non-linear changes in the light distribution in the scintillation apparatus as a function of location; i.e. events are not recorded in their correct locations with respect to the overall image. The result is localized image event compression or expansion appearing in the image as erroneous variations in image intensity. Thus, even though the displacements of individual events are not visually apparent in the image, spatial distortions cause noticeable field intensity non-uniformities.

The prior art utilizes various techniques to attempt to correct for the spatial distortions and field non-uniformities in scintillation cameras.

One distortion correction method of the prior art utilizes image processing to appropriately increase or decrease the total counts or image events in a particular area by using information from previously acquired field floods. However, these methods do not correctly compensate for the primary causes of non-uniformities, namely spatial distortion.

Another method of the prior art disclosed in U.S. Pat. No. 3,745,345 which issued to G. Muehllehner on July 10, 1973 measures the spatial distortion of an Anger camera to obtain coordinate corrections factors for the camera. The coordinate corrections factors are stored in the camera and image forming apparatus for use in correcting an image. The correction factors are stored on an elemental image area basis with each elemental image area having a predetermined area. An uncorrected digital image or map is accumulated in an analyzer. A data system, in one arrangement, takes the image event count information on an elemental area basis and redistributes the accumulated counts in each elemental area into new image area locations in accordance with the coordinate corrections factors. In another arrangement, the coordinate correction factors are utilized to correct the signals corresponding to each scintillation event. The coordinate corrections factors are obtained from image data taken from a regular array of point sources at known image point locations. An apertured plate provides the array of point sources and multiple exposures are performed with the plate being shifted to a different predetermined orientation for each exposure.

Other distortion correction and distortion measurement techniques include the analysis of image data obtained from line patterns, scanning a point source across the image field, and full image area field floods. In the full field flood techniques, the gradient of the field flood is utilized to indicate correctional shifts.

While the above described prior art arrangements are generally suitable for their intended purpose, it would be desirable to provide a method and apparatus for improved correction of spatial distortion characteristics of Anger scintillation cameras and the like.

SUMMARY OF THE INVENTION

Accordingly it is a principal object of the present invention to provide an improved method and apparatus to correct for the spatial distortion characteristics of scintillation cameras and image forming apparatus.

It is a further object of the present invention to provide an improved method for determining the distortion correction factors for scintillation cameras for use in the repositioning of events to provide accurate images.

It is another object of the present invention to provide a method and apparatus for repositioning scintillation camera event signals on a real time basis and event by event with a high degree of precision; the events being accurately repositioned in accordance with a stored array of correction factors.

Briefly and in accordance with one embodiment of the present invention, a method and apparatus is provided to correct for the spatial distortions of scintillation cameras or similar image forming apparatus. The spatial distortion correction method accurately and precisely determines distortion correction factors in an off-line test measurement and analysis phase prior to actual on-line diagnostic use. The distortion correction factors are initially determined from image event data that is obtained during the test measurement phase by orthogonal line pattern images. Data from a uniform field flood image is also utilized during the test measurement phase to refine and modify the distortion correction factors utilizing the gradient of a function of the field flood image data. Scintillation camera image repositioning apparatus is provided and includes a memory having the correction factors stored therein in a predetermined array. During the on-line use of the scintillation camera and associated image display system, the image repositioning apparatus transforms the data from the scintillation camera in accordance with the stored distortion correction factors. In a preferred arrangement, the image event data is repositioned or corrected event by event.

These and other objects of the present invention will become apparent from the following detailed description taken in conjunction with the accompanying drawings.

BRIEF DESCRIPTION OF THE DRAWINGS

FIG. 1 is a block diagram representation of the spatial distortion correction method and apparatus of the present invention illustrated in conjunction with a scintillation camera and image display apparatus;

FIGS. 2 and 3 are diagrammatic representations of line pattern masks utilized in the test measurement phase of the present invention in conjunction with the apparatus of FIG. 1;

FIGS. 4 and 5 are diagrammatic representations of image data obtained by the apparatus of FIG. 1 during the test measurement phase;

FIGS. 6, 7, 8 and 9 are diagrammatic representations illustrating the analysis techniques of the present invention to determine the distortion corrections factors;

FIG. 12 is a block diagram representation of the image repositioning apparatus of FIG. 1.

DETAILED DESCRIPTION OF THE PREFERRED EMBODIMENT

Figure 7:
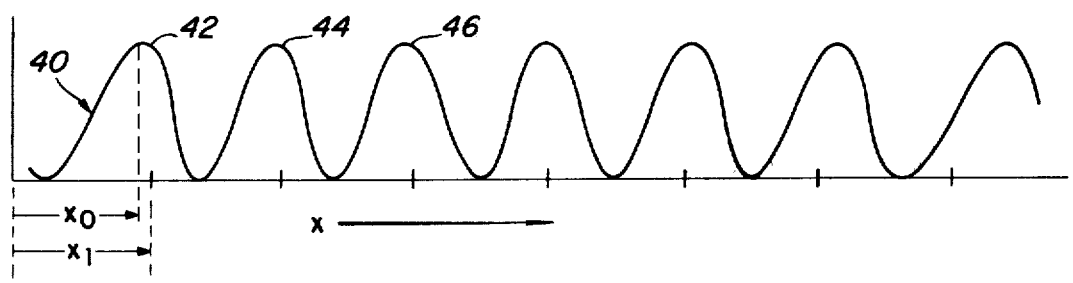

The method and apparatus of the present invention is suitable for use with a scintillation camera referred to generally at 10 in FIG. 1. The scintillation camera 10 converts scintillation events into electrical signals that represent the position coordinates of the scintillation event as seen by the camera 10 with respect to the x, y coordinate system of the camera 10. The scintillation camera 10 in a preferred embodiment is an Anger-type camera well known in the scintillation camera field and as further described in U.S. Pat. No. 3,745,345 to which reference may be made for a more complete description of the detailed structure and operation of an Anger camera and the associated apparatus for providing an image display of received gamma radiation. The camera 10 includes x, y signal output lines 12 representing the image event positional data as analog voltages.

In accordance with important aspects of the present invention, the spatial distortion characteristics of the camera 10 are accurately determined in an off-line test measurement and analysis phase that is performed prior to and independently of an on-line image forming phase of the camera 10 that corresponds to the intended use of the camera; e.g. diagnostic purposes.

In the off-line test measurement and analysis phase, a line pattern image analysis is performed in two steps corresponding to two orthogonal orientations of a line pattern. Further, in the off-line test measurement and analysis phase, a field flood image analysis is also performed. During the test measurement and analysis phase, data representing the image events as seen by the camera 10 is obtained by a data storage arrangement 14 over the x, y signal output lines 12. The data obtained during the test measurement and analysis phase is then utilized by a general purpose computer 16 to analyze the data and determine distortion correction coefficients in a predetermined array that defines the distortion corrections to be applied to individual image events throughout the image areas of the camera 10.

The distortion correction coefficients are stored in image repositioning apparatus 18 for use in the on-line image forming use of the camera 10. During the on-line image forming use of the camera 10, the image repositioning apparatus 18 utilizes the stored distortion correction coefficients to correct the image event data on the x, y signal output lines 12 from the camera 10 with the appropriate distortion correction coefficients of the array being selected in accordance with the respective image event positions. The image event coordinates and corresponding selected distortion correction coefficients are utilized in a bivariate interpolation operation to determine the appropriate correctional displacement to be applied to the image event coordinates. The appropriate correctional displacement is then added to the image event coordinates from the camera 10 to provide corrected image event data.

The image repositioning apparatus 18 outputs the corrected image event data on output signal lines 19 to conventional image display and control apparatus 20 to display the corrected image. The corrected image event data in a specific arrangement is also outputted to image data storage and/or analysis apparatus 21 for direct data analysis independent of the image display of the apparatus 20. The corrected signal output data on lines 19 of the image repositioning apparatus in specific embodiments includes both analog and digital formats.

Considering now a more detailed discussion of the off-line test measurement analysis phase, the line pattern image analysis is performed by positioning a line pattern mask 22 over a detector head 24 of the camera 10 in a first predetermined orientation. A point source 26 of gamma radiation is positioned at a suitable distance in front of the camera detector head 24 to provide uniform radiation through the line pattern mask 22. In a specific embodiment, the line pattern mask 22 is fabricated from a lead plate. The x, y signal output lines 12 are connected to the data storage arrangement 14 during the off-line test measurement and analysis phase.

Thus, during the off-line test phase, the data storage arrangement 14 is utilized to obtain a digital representation in a predetermined data format of the line pattern corresponding to the mask 22. Further, during the off-line test measurement and analysis phase, the line pattern mask 22 is oriented to a second predetermined orientation orthogonal to the first predetermined orientation and data is obtained by the data storage arrangement 14 representing the line pattern in a digital format.

In one specific arrangement and referring now to FIG. 2, a line pattern mask 22 is utilized having twenty-seven parallel slits 28 of one millimeter width spaced every 15 mm across the camera face in conjunction with a camera face dimension of approximately 400 mm. The portions of the mask 22 between the parallel slits 28 are referred to at 29. The thickness of the lead mask 22 in a specific embodiment is 3 mm.

To measure the inherent spatial distortion characteristics of the camera 10, the line pattern mask 22 is orientated on the face of the camera 10 with the spaced parallel slits 28 in a y line orientation with respect to the coordinate system of the camera 10 to measure the spatial distortion characteristics of the camera 10 in the x direction. An appropriate registration arrangement is provided on the mask 22 for accurate positioning on the detector head 24 of the camera 10. For example, a suitable number of registration holes 31 are provided spaced about the periphery of the mask 22. With the line pattern mask 22 as shown in FIG. 2, a representation of a y line pattern image is obtained by the data storage unit 14 in a predetermined data format.

In a preferred embodiment, the data format is digital and thus the data storage arrangement 14 includes an analog to digital converter to convert the analog data on the x, y signal output lines 12 to digital data. In a specific arrangement, a 256×256 array of image data is obtained by the data storage unit 14 with an information depth of 8 bits. Further, in a specific arrangement, nine images or exposures are utilized to collect image data information to an information depth of 12 bits at each of the 256×256 array locations. It should also be realized that in other specific arrangements, a data storage unit 14 having an information depth of 12 bits in a 256×256 image array can be utilized with one exposure of suitable duration. The digital image data representation obtained in the data storage unit 14 corresponds to the line pattern oriented in the y direction of FIG. 2 and includes the spatial distortions of the camera 10.

Next in the off-line test measurement and analysis phase, the line pattern mask 22 is repositioned as shown in FIG. 3 with the parallel slits 28 being oriented in the x direction to measure the spatial distortion characteristics of the camera 10 in the y direction. The data storage unit 14 is then utilized to collect or record a digital image representation of the line pattern mask 22 as oriented in FIG. 3 to collect a 256×256 array of image representations with a data depth of 12 bits at each array location. The result is map or image of the pattern 12 as reproduced by the camera 10 with the inherent spatial distortion characteristics.

Referring now to FIG. 4, a pictorial representation of the digital image data obtained during the off-line test measurement and analysis phase of a line pattern mask 22 in the y line orientation illustrates the spatial distortions of the camera 10 in an exaggerated fashion. The enlarged portion 28a of one of the image lines shows the displacement along the line in the x direction from the line pattern slit 28 due to distortions by the camera 10. Similarly, the x line pattern image representation in FIG. 5 illustrates an enlarged portion 28a of one of the image lines and the distortion displacements in the y direction from the line slit 28 of the original pattern of the mask 22.

The image representation data obtained from the orthogonal line pattern images and stored in the data storage arrangement 14 is utilized by the test analysis computer 16 to develop an array of correction coefficient factors represented as $\Delta \overline{V}$ (x, y). The correction coefficient factors are obtained by comparing the measured image data with the correct image that would be obtained by the camera through the line pattern mask 22 if no spatial distortions were present.

In accordance with the present invention, the analysis program of the computer 16 digitally determines the positions of the line patterns. The position of the lines 28a are determined along a predetermined number of equally spaced x direction sample lines across the image area coordinate system. As illustrated in FIG. 6, the x direction sample lines 32, 34 and 36 represent three of the sample lines. From each of the x direction sample lines, a peak data pattern 40 as shown in FIG. 7 is obtained. The peak pattern 40 is generated by plotting the peaks of the y line data in the x direction. Thus, each peak 42, 44, 46 etc. corresponds to the position of a respective y line of the image data representation outputted to the data storage arrangement 14 during the line pattern mask exposure. Thus, the x coordinate position of each y line peak can be compared to the x coordinate position of the original y line pattern of the mask 22 on the coordinate plane of the camera 10 to provide a measure of the spatial distortion characteristics of the camera 10 in the x direction for the particular sample line plotted. For example, the first peak 42 occurs at an x coordinate position $x_0$ while the correct position of the first y line would occur at the position $x_1$ if no spatial distortion by the camera 10 occurred. Similarly, peak data similar to FIG. 7 is analyzed for each of the predetermined number of spaced x direction sample lines 32, 34, 36 etc. at equally spaced y coordinates to obtain the spatial distortions of the camera in the x direction at the measured position.

In a specific embodiment, the digital image representation pattern is sampled at 64 times (i.e. 64 x direction sample lines) across the face of the camera 10 in the y direction and thus 64 peak patterns 40 as shown in FIG. 7 are analyzed.

Figure 8:
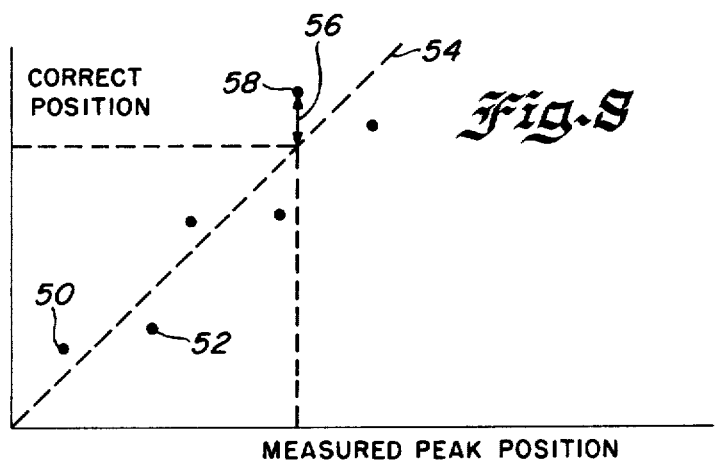
Figure 9:
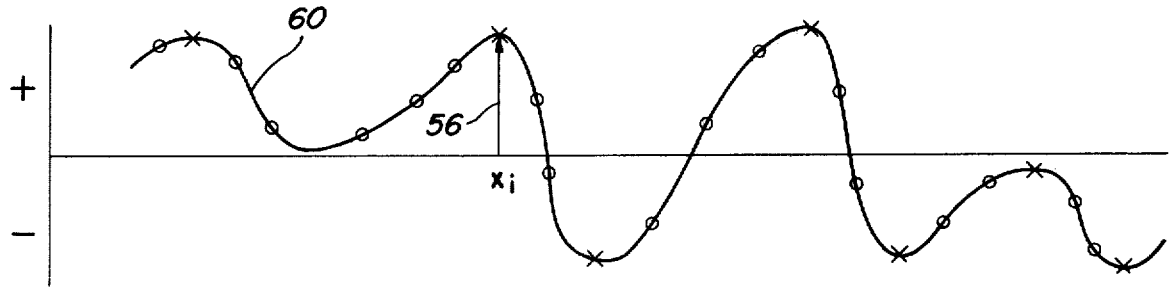

If the peak data of FIG. 7 is plotted with measured positions along the abscissa coordinate axis and the correct peak position along the oridinate axis, the plot of FIG. 8 results with each of the dots such as 50, 52 representing a plotted measured point and the straight line 54 representing the plot where no deviations are present between measured and correct peak locations of the y line data. Thus, the distance 56 between the plotted point 58 and the straight line 54 represents the deviation between the measured peak position and correct position of one y line along one x direction sample line. Referring now to FIG. 9, the deviations such as 56 of FIG. 8 are analyzed by calculating the deviations such as 56 on the ordinate axis versus the x coordinate of the measurement points 50, 52, 58 along the abscissa as illustrated by the distortion plot of FIG. 9. For an x sample line across the entire camera face, 27 such deviations, one for each y line peak, will occur. The plotted deviations are represented in FIG. 9 by the symbols x. Thus, the various plotted points for the particular x direction sample lines plotted represent the x coordinate distortion of the camera 10 at the respective x coordinate position along the abscissa. For example, the deviation 56 of FIG. 9 represents the distortion of the camera 10 in the x direction at the x coordinate $x_i$ and corresponds to the measured point 58 of FIG. 8. In accordance with the shape and characteristics of the distortion plot of FIG. 9 and by statistical analysis principles, a curve fitting analysis is utilized to define a best fit curve 60 corresponding to a function that defines the distortion of the camera 10 in the x direction along the x direction sample that is plotted. The particular desired precision in defining the curve 60 defines the appropriate curve fitting analysis method.

The curve 60 of FIG. 9, derived from the peak analysis of FIGS. 7 and 8 has 27 peak or measurement points denoted by x's cooresponding to the 27 line pattern slits in the mask 22. Thus, if it is desired to obtain a distortion correction coefficient array of 64×64, the best fit curve 60 and the represented polynomial function is utilized to define distortion coefficient data at each of the array points; i.e. 64 points spaced evenly across the x coordinate direction of the camera 10. Thus, in effect interpolation is utilized to define 64 distortion coefficients in the x direction from the original 27 measured points. The interpolation to define the 64 points from the 27 measured points is justified since the spatial distortions across the camera 10 change gradually and do not change extremely rapidly within certain ranges. The 64 calculated correction coefficient data points are represented by circles along the curve 60 of FIG. 9.

Thus, the computer 16 for each of the 64 x direction sample lines such as 32, 34 and 36 of FIG. 6 calculates 64 evenly spaced correction displacement factors in the x direction. The result is a 64×64 array of distortion correction displacement factors or coefficients defined at predetermined and equally spaced array points of the camera face. Of course it should also be understood that the present invention contemplates different specific analysis methods to obtain an array of displacement correction factors. Further, it should also be understood that a different number of array points are calculated in specific embodiments such as a 256×256 array. Further, while 27 parallel slits are used in one specific embodiment for the line pattern mask 22, it should be understood that line pattern masks with different numbers of lines may also be utilized in the analysis.

Figure 10:
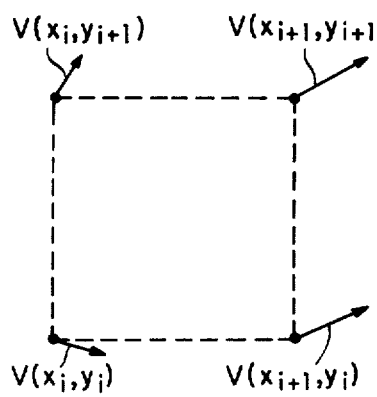
FIG. 10 is a diagrammatic representation of the distortion correction factors that are determined by the present invention.

Similarly, from the x line pattern analysis and the digital data representations stored in the data storage arrangement 14 corresponding to FIGS. 3 and 5, the computer 16 also calculates a 64×64 array of y distortion correction coefficients at the same array points at which the x distortion correction coefficients are calculated. The overall result from the orthogonal line pattern image analysis in the test measurement and analysis phase is a 64×64 array of correction coefficients $\Delta \overline{V}$ (x, y); i.e. a 64×64 array including an x distortion correction factor and a y distortion correction factor. Thus, each of the array points $\Delta \overline{V}$ ($x_i$, $y_i$) represents the correction factor as a vector and magnitude between the actual measured image event point and the correct image position corresponding to the image event point without any spatial distortions. In vectorial direction, the distortion correction factor to be applied to an image event points at the x, y signal output 12 of the camera 10 is opposite to that of the measured distortion in the test measurement and analysis phase since the measured vector is 180° opposite to that of the correction vector for use in the repositioning of the image event point from the distorted measured points to the corrected image point. Referring now to FIG. 10, the distortion correction coefficients are illustrated as vectors at four adjacent array points in the 64×64 array in direction and magnitude. Each vector includes an x and y distortion correction coefficient.

Figure 11:
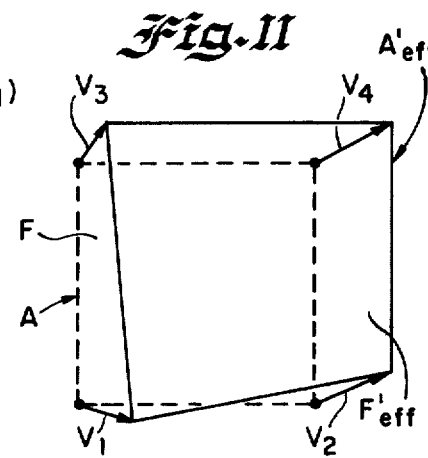
FIG. 11 is a diagrammatic representation illustrating the analysis techniques of the present invention to utilize the field flood image data of the test measurement phase to modify the distortion correction factors obtained by the line pattern image analysis phase.

As discussed hereinbefore, a field flood image analysis is also performed during the test measurement and analysis phase wherein digital image representation data is obtained by the data storage arrangement 14. Referring now to FIG. 11, the field flood image data is utilized by the computer 16 to calculate the effective number of total image events that occurred per unit area A of each array cell defined between the four adjacent array points of the 64×64 array of correction factors $\Delta \overline{V}$ (x, y). For example, the computer 16 calculates an image density factor F that corresponds to the flood image event density per unit cell area A. Next the computer 16 calculates the effective image event intensity count $F'_{eff}$ corresponding to the effective image event density that would occur in the corrected image per unit area $A'_{eff}$ after the distortion correction factors $\Delta \overline{V}$ (x, y) are applied to reposition each image event. For illustrative purposes, this can be conceptualized as the measured event density $F_i$ for a particular array unit cell area $A_i$ being repositioned in accordance with the distortion correction coefficients $\Delta \overline{V}$ ($x_i$, $y_i$) for the cell i into a corrected unit cell area $A_{i\ eff}$. The result is a corrected image event density $F'_{i\ eff}$ in the corrected unit cell area $A'_{i\ eff}$.

The $F'_{i\ eff}$ should be a uniform density; i.e. equal for all units areas of the corrected image since the input data is a uniform field flood test. To determine if the distortion correction coefficient array $\Delta \overline{V}$ (x, y) will achieve the desired uniform density in the corrected image display, the gradient of the corrected density function $F'_{eff}$(x, y) is utilized to refine and modify the $\Delta \overline{V}$ (x, y) distortion correction coefficients. Specifically, the gradient of $F'_{eff}$(x, y) in accordance with an appropriate scale factor is utilized to modify each of the distortion correction coefficients $\Delta \overline{V}$ ($x_i$, $y_i$) by applying a correction factor with the gradient of $F'_{eff}$(x, y) being evaluated over different adjoining areas of the unit cell i for which the distortion correction coefficients $\Delta \overline{V}$ ($x_i$, $y_i$) are being modified. The gradient of the function $F'_{eff}$ (x, y) and the associated scale factor are represented in combination as $\delta \overline{V}$. Thus, the following relationship describes the modifications of the distortion correction coefficients $\Delta \overline{V}$ (x, y) obtained from the orthogonal line image analysis to obtain the modified distortion correction coefficients $\Delta \overline{V}'$ (x, y):

$$\Delta \overline{V}'(x_i, y_i) = \Delta \overline{V} (x_i, y_i) + \delta \overline{V}$$

The modification is performed iteratively while the gradient of $F'_{eff}$(x, y) is evaluated over different adjoining areas about the unit cell i. For each iteration n+1, the modified distortion correction coefficient obtained from the previous iteration n are utilized such that the coefficients are successively modified and refined. For the first modification, the original distortion correction coefficients $\Delta \overline{V}$ (x, y) obtained from the orthogonal line pattern analysis are utilized. The iterations are performed starting with a relatively small adjoining area of adjacent array cells to the cell i and then changing the area for each iteration.

Considering now the details of calculating the function $F'_{eff}$(x, y), the four adjacent distortion correction coefficient vectors represented as $\overline{V}_1$, $\overline{V}_2$, $\overline{V}_3$ and $\overline{V}_4$ in FIG. 11 at the four respective adjacent array points define the unit cell i of area A. Each of the vectors $V_1$-$V_4$ originates from the respective array point and the tips or heads of the four adjacent vectors define the corrected cell area $A'_{eff}$. The corrected cell area $A'_{eff}$ corresponds to a shifting or repositioning of all image event data occurring in the original area A of the unit array cell to the corrected image area $A'_{eff}$. The area $A'_{eff}$ is obtained by vector cross product analysis. The unit array cell i of area A also has associated therewith a density function $F_i$ calculated from the field flood image data. The factor $F'_{eff}$ is calculated from the following relationship:

$$F'_{i eff} = (F_i \times A_i)/A_{i eff}$$

where the subscript i denotes a particular unit cell i of the image array. As described hereinbefore, the density factor $F'_{i\ eff}$ is calculated for all the array cells in the 64×64 array and the gradient analysis is performed to define the gradient of the function $F'_{eff}$(x, y) over predetermined areas including a predetermined number of unit cells of the array.

The result of the test measurement and analysis phase is a 64×64 array of distortion correction coefficients $\Delta \overline{V}'$ (x, y). The correction factors are stored in the memory of the on-line image repositioning apparatus 18 for use in the repositioning of image events during an on-line image forming use of the camera 10 and the associated image display forming apparatus. In a preferred embodiment and for optimum usage of the correction factors $\Delta \overline{V}'$ (x, y), the array is stored in the memory of the image repositioning apparatus 18 as a number of coefficient factors C1-C8 including the sums and differences of the actual x and y distortion correction coefficients $\Delta \overline{V}$ (x, y) calculated by the computer 16 in the test measurement and analysis phase as will be explained in more detail hereinafter. In a specific embodiment, each of the coefficient factors C1-C8 includes 8 bits of information.

Referring now to FIG. 12, the on-line image repositioning apparatus 18 includes an x coordinate analog to digital converter (ADC) 100 and a y coordinate analog to digital converter (ADC) 102. The analog inputs of the analog to digital converters 100 and 102 are respectively connected to the x and y analog signal output lines 12 of the camera 10. As image events occur, analog signals are presented at the output lines 12 and the converters 100 and 102 transform the analog x, y signals at 12 into 12 bit signal data representations on 12 separate data output lines for each of the x and y coordinates. The most significant six data lines 104 and 106 respectively of the digital x and y data from the converters 100 and 102 are connected to the x and y address inputs of a coefficient memory 108. The coefficient memory 108 outputs coefficients C1 through C8 in a digital format on data lines 110 in response to the most significant six bit x and six bit y address data lines 104, 106.

Figure 13:
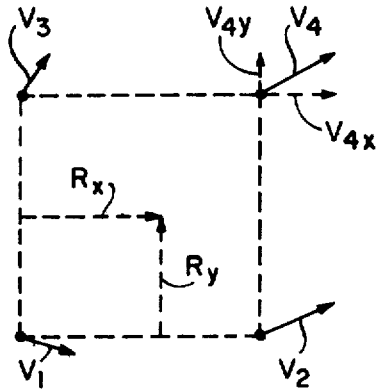
FIG. 13 is a diagrammatic representation illustrating the operation of the image repositioning apparatus of FIG. 12.

Referring now to FIG. 13, the coefficients C1 to C8 correspond to the x and y components of the original correction vector coefficients $a\overline{V}$ (x,y) as defined in terms of the four adjacent correction vectors of each unit cell of the array at the respective four adjacent array points as follows:

$C_1 = V_{1x}$
$C_2 = V_{2x} - V_{1x}$
$C_3 = V_{3x} - V_{1x}$
$C_4 = V_{4x} - V_{3x} - V_{2x} + V_{1x}$
$C_5 = V_{1y}$
$C_6 = V_{2y} - V_{1y}$
$C_7 = V_{3y} - V_{1y}$
$C_8 = V_{4y} - V_{3y} - V_{2y} + V_{1y}$

The coefficient factor output lines 110 are connected to one digital data input of a correction interpolator 112. The correction interpolator 112 includes at two digital data inputs the least significant six bits of the digital x and y coordinate date on output data lines 114 and 116 respectively. The least significant 6 bits of x and y coordinate information on lines 114, 116 respectively define the residual functions Rx and Ry as shown in FIG. 13.

The correction interpolator 112 is arranged to perform the following bivarite interpolation operations:

$\Delta x = C_1 + C_2 R_x + C_3 R_y + C_4 R_x R_y$ $\Delta y = C_5 + C_6 R_x + C_7 R_y + C_8 R_x R_y$ where $R_x$ and $R_y$ define the coordinates of the image event within the array unit cell. The $\Delta x$ and $\Delta y$ results of the above operations are provided at respective $\Delta x$ and $\Delta y$ analog outputs of the interpolator 112.

The $\Delta x$ analog correction factor from the interpolator 112 is connected to one input of a summing amplifier 118. A second input of the summing amplifier 118 is connected to the $x_a$ analog data input of the signal line 12 from the camera 10. The summing amplifier 118 outputs the corrected image event result $x_c = \Delta x + x_a$ as a corrected, repositioned x coordinate of the image event for use by the image and display control apparatus 20. Similarly, the $\Delta y$ analog output of the interpolator 112 is connected to one input of a summing amplifier 120 and the $y_a$ data from the signal line 12 from the camera 10 is connected to a second input of the summing amplifier 120. The summing amplifier outputs the analog value $y_c = \Delta y + y_a$ to the image and display control apparatus 20.

By way of example and to illustrate the performance of the present invention, the distortion correction coefficients calculated in accordance with the present invention by the orthogonal line image analysis and gradient field flood modification when utilized in the image repositioning apparatus 18 are capable of correcting a camera 10 having uncorrected image field flood density variations of 10% to a corrected image having density variations of approximately 1%. For comparison, the use of the distortion correction coefficients obtained by orthogonal line image analysis alone result in a correction of a camera having 10% uncorrected image variations in the field flood density across the field to approximately 4%. Further the use of distortion correction coefficients obtained by gradient analysis of field flood image data alone results in a correction of a camera having 10% uncorrected variations in the field flood density to approximately 3%.

It is assumed that the spatial distortion characteristics of the camera 10 may vary to some degree during the diagnostic life and usage of the camera. These variations may be due to the replacement of the photomultiplier tubes, drift, aging or replacement or adjustment of other electronic parts. In accordance with important aspects of the present invention, the distortion correction coefficients may be re-evaluated and reprogrammed as necessary as determined by testing the imaging characteristics of the camera 10 and the image repositioning apparatus 18. Test image data from line patterns and field floods may be taken at the camera site and new distortion correction coefficients may be calculated from the resulting test data either at the camera site by the computer 16 or at the manufacturing and testing facility of the camera manufacture. In accordance with further important aspects of the present invention, it has been found that normally only the data from a field flood test is necessary to achieve the necessary distortion correction coefficient modifications. In that case, only the field flood test would need to be performed and the original line image analysis coefficient $\Delta V$ (x, y) could be modified by the computer 16 in accordance with the field flood test data.

While the method of the present invention has been described in terms of event by event repositioning, it should be understood that the present invention is also applicable to post image modification wherein the entire image data is recorded and the image data is then modified. However, the preferred embodiment of the present invention encompasses an event by event modification in real time as the signals representing the events occur in order to minimize the storage requirements and optimize the speed of the overall imaging process. Further, in a specific embodiment, the functions performed by the image repositioning apparatus 18 is performed by a computer in accordance with a stored program. However, the preferred embodiment is the image repositioning apparatus of FIGS. 1 and 12.

In the preferred embodiment of the present invention, the data storage arrangement 14 and the computer 16 are utilized only during the off-line test measurement and analysis phase to obtain the distortion correction coefficients. Thus, the data storage arrangement 14 and the computer 16 are detachable from the camera 10 and associated apparatus so that the data storage arrangement 14 and the computer 16 are capable of being utilized for more than one camera 10 either on an independent or time shared basis. Further, the image repositioning apparatus 18 is utilized only in the on-line image display use of the camera 10.

While there has been illustrated and described several embodiments of the present invention, it will be apparent that various changes and modifications thereof will occur to those skilled in the art. It is intended in the appended claims to cover all such changes and modifications as fall within the true spirit and scope of the present invention.

We claim:

1. A spatial distortion correction method for use in correcting the inherent distortion characteristics of radiation imaging apparatus, the radiation imaging apparatus including data output signals representing image event coordinates, the spatial distortion correction method comprising the steps of:

calculating spatial distortion correction factors at a predetermined number of image event points from orthogonal line pattern test data obtained in an initial off-line test phase;

modifying said spatial distortion correction factors calculated in said calculating step in accordance with image field test data obtained in an off-line test phase, said image field test data including image event data obtained from a uniform image irradiation of said radiation imaging apparatus;

storing said modified spatial distortion correction factors for use in correcting the image event data output signals from said radiation imaging apparatus; and correcting the image event data output signals from said radiation imaging apparatus during on-line operation in accordance with said modified spatial distortion correction factors.

2. The spatial distortion correction method of claim 1 wherein said modification step comprises iteratively modifying said calculated spatial distortion correction factors by using the gradient of the effective image event density on a per unit area basis of the corrected image event data as defined by the distortion correction factors of said calculating step, each of said iterative modifications comprising an evaluation of said gradient over an image area of a different size.

3. The spatial distortion correction method of claim 1 wherein said correcting step comprises the steps of:

receiving said data output signals from said radiation imaging apparatus representing image event coordinates during an on-line radiation imaging phase; and calculating image event coordinate repositioning correction factors from said stored modified spatial distortion correction factors and said data output signals.

4. The spatial distortion correction method of claim 3 wherein said calculating step further comprises the steps of:

obtaining the portion of the image event coordinates of said data output signals that defines the position of the image event coordinate data within the four respective adjoining array points of said predetermined number of image event points, reading out said stored modified spatial distortion correction factors for the area bounded by said four respective adjoining array points immediately bounding the image event coordinate signal; and interpolating said read-out modified spatial distortion correction factors and said obtained portions of said image event coordinates of said data output signals to obtain said image event coordinate repositioning correction factors.

5. The spatial distortion correction method of claim 4 further comprising the step of combining said data output signals from said radiation imaging apparatus and said image event coordinate repositioning correction factors to obtain corrected repositioned image event coordinate signals for use by image display forming apparatus or image event coordinate analyzing apparatus.

6. The spatial distortion correction method of claim 3 wherein said calculating step is performed for each individual data output signal as said data output signal is received from said radiation imaging apparatus.

7. Spatial distortion correction apparatus for use with radiation imaging apparatus of the type having data output signals representing image event coordinates and image display forming apparatus responsive to image event coordinate signals, the spatial distortion correction apparatus comprising:

memory means having stored therein a predetermined array of distortion correction coefficients defining at the respective array points the distortion correction factor to be utilized to modify image event data to correct the spatial distortion characteristics of a particular radiation image apparatus, said distortion correction coefficients being calculated from image test data in an initial off-line teach phase, said memory means including address means being responsive to image event coordinate signals to output the distortion correction coefficients for the area bounded by the four respective array points immediately bounding the image event coordinate signal;

interpolation means responsive to said outputted distortion correction coefficient and the image event coordinate signals for determining repositioning image event coordinates, said interpolation means including means for performing a bivariate interpolation using the outputted distortion correction coefficients and the portion of the image event coordinate data that defines the position of the image event coordinate data within said four respective adjoining array points; and means responsive to said image event coordinate signals and said repositioning image event coordinates for outputting a corrected, repositioned image event coordinate signals for use by image display forming apparatus or image event coordinate analyzing apparatus.

8. The spatial distortion correction apparatus of claim 7 wherein said distortion correction coefficients are calculated during said initial off-line test phase from orthogonal line pattern image data as modified by the gradient of the effective image event density obtained from uniform image irradiation data.

9. The spatial distortion correction apparatus of claim 7 wherein said data output signals represent image event coordinates in X and Y dimensions as two respective X and Y analog data signal outputs, said interpolation means further comprising analog to digital converter means responsive to said X and Y analog data signal outputs for outputting X and Y digital representations of said X and Y analog data signal outputs, each of said X and Y digital representations being in a digital data format of $2^N$ bits of information, said address means of said memory means being responsive to a predetermined number of the most significant bits of information of said X and Y digital representations defining the coordinate area bounded by the four respective array points immediately bounding the image event coordinate signal, said interpolation means being responsive to a predetermined number of the least significant bits of information of said X and Y digital representations defining the position of the image event coordinate data within said four respective adjoining array points.

10. The spatial distortion correction apparatus of claim 9 wherein said distortion correction coefficients stored in said memory means define X and Y digital spatial distortion correction representations in the X and Y coordinates in an array of $2^{N-m} \times 2^{N-m}$, where N-m is the predetermined number of most significant bits of information, said interpolation means performing one of $2^m$ different possible bivariate interpolations with said outputted digital spatial distortion correction representations for each of said image event coordinates within each of said areas bounded by the four respective array points bounding said respective image event coordinates where m is the predetermined number of least significant bits of information.

11. A spatial distortion measurement and correction method for use in measuring and correcting the inherent spatial distortion characteristics of radiation imaging apparatus, the radiation imaging apparatus including a detector head and data output signals representing image event coordinates, the spatial distortion measurement and correction method comprising the steps of:

performing a line pattern image analysis in a first predetermined direction by obtaining line pattern image event test data during an off-line test phase with a line pattern being oriented in a first predetermined direction on said detector head and uniform image irradiation being applied to said detector head;

performing a line pattern image analysis in a second predetermined direction by obtaining line pattern image event test data during the off-line test phase with the line pattern being oriented in a second predetermined direction on said detector head orthogonal to said first predetermined direction and uniform image irradiation being applied to said detector head;

performing an image field analysis by obtaining field image event test data during the off-line test phase with uniform image irradiation being applied to said detector head;

calculating spatial distortion correction factors at a predetermined number of image event points from the orthogonal line pattern test data obtained from said line pattern image analysis performing steps of the off-line test phase;

modifying said spatial distortion correction factors calculated in said calculating step in accordance with the image field test data obtained from said image field analysis performing step of the off-line test phase;

storing said modified spatial distortion correction factors for use in correcting the image event data output signals from said radiation imaging apparatus; and correcting the image event data output signals from said radiation imaging apparatus during on-line operation in accordance with said modified spatial distortion correction factors.

* * * * *